United States Patent
Varma et al.

(10) Patent No.: US 8,949,809 B2
(45) Date of Patent: Feb. 3, 2015

(54) AUTOMATIC PIPELINE PARALLELIZATION OF SEQUENTIAL CODE

(75) Inventors: Pradeep Varma, New Delhi (IN); Manish Gupta, Bangalore (IN); Monika Gupta, New Delhi (IN); Naga Praveen Kumar Katta, Rajahmundry (IN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 13/409,536

(22) Filed: Mar. 1, 2012

(65) Prior Publication Data
US 2013/0232476 A1    Sep. 5, 2013

(51) Int. Cl.
*G06F 9/45*   (2006.01)

(52) U.S. Cl.
USPC ............... 717/150; 717/159; 717/161

(58) Field of Classification Search
CPC ...................................... G06F 8/443
USPC .................. 717/124–135, 149–161; 712/233, 712/241–244
See application file for complete search history.

(56) References Cited

U.S. PATENT DOCUMENTS

| | | | |
|---|---|---|---|
| 7,530,069 B2 | 5/2009 | Kawahara et al. | |
| 2002/0083416 A1 | 6/2002 | Click, Jr. et al. | |
| 2005/0172299 A1 | 8/2005 | Zhao et al. | |
| 2005/0188364 A1* | 8/2005 | Cockx et al. | 717/159 |
| 2007/0169057 A1* | 7/2007 | Silvera et al. | 717/160 |
| 2008/0098208 A1 | 4/2008 | Reid et al. | |
| 2008/0127146 A1 | 5/2008 | Liao et al. | |
| 2009/0077545 A1 | 3/2009 | Silvera et al. | |
| 2009/0288075 A1* | 11/2009 | Song et al. | 717/160 |
| 2010/0199257 A1* | 8/2010 | Biggerstaff | 717/104 |
| 2010/0257516 A1* | 10/2010 | Roediger et al. | 717/155 |
| 2010/0274972 A1* | 10/2010 | Babayan et al. | 711/125 |
| 2010/0281489 A1* | 11/2010 | Lee et al. | 718/106 |
| 2010/0306736 A1 | 12/2010 | Bordelon et al. | |
| 2010/0306753 A1 | 12/2010 | Yi et al. | |
| 2012/0144376 A1* | 6/2012 | Van Eijndhoven et al. | 717/146 |
| 2013/0125097 A1* | 5/2013 | Ebcioglu et al. | 717/136 |

OTHER PUBLICATIONS

Lazarescu et al., Dynamic trace-based data dependency analysis for parallelization of C programs, 2012, IEEE, pp. 126-131.*
Ottoni et al., Global Multi-Threaded Instruction Scheduling, 2007, IEEE, pp. 56-68.*
Wu et al., A Novel Speculative Multithreading Parallelization Method in Chip Multiprocessor Systems, 2010, IEEE, pp. 322-326.*
Ceng, et al.; MAPS: An Integrated Framework for MPSoC Application Parallelization; DAC 2008, Jun. 8-13, 2008, Anaheim, California, USA; pp. 754-759.

(Continued)

*Primary Examiner* — Satish Rampuria
(74) *Attorney, Agent, or Firm* — Schmeiser, Olsen & Watts, LLP; John Pivnichny

(57) ABSTRACT

A system and associated method for automatically pipeline parallelizing a nested loop in sequential code over a predefined number of threads. Pursuant to task dependencies of the nested loop, each subloop of the nested loop are allocated to a respective thread. Combinations of stage partitions executing the nested loop are configured for parallel execution of a subloop where permitted. For each combination of stage partitions, a respective bottleneck is calculated and a combination with a minimum bottleneck is selected for parallelization.

20 Claims, 7 Drawing Sheets

(56) References Cited

OTHER PUBLICATIONS

Curry, Timothy W.; Profiling and Tracing Dynamic Library Usage Via Interposition; Sun Microsystems, Inc.; 12 pages.
Dia, et al.; Automatically Partitioning Packet Processing Applications for Pipelined Architectures; PLDI '05, Jun. 12-15, 2005; Chicago, Illinois, USA; pp. 237-248.
Dig, et al.; ReLooper: Refactoring for Loop Parallelism in Java; OOPSLA '09, Oct. 25-29, 2009, Orlando, Florida, USA; 2 pages.
Edison Design Group; C++ Front End; Internal Documentation (excerpt); Mar. 17, 2011 (Version 4.3); West Orange, New Jersey; 122 pages.
Gordon, et al.; A Stream Complier for Communication-Exposed Architectures;ASPLOS X Oct. 2002, San Jose, CA, USA; pp. 291-303.
Huang, et al.; Decoupled Software Pipelining Creates Parallelization Opportunities; CGO '10, Apr. 24-28, 2010, Toronto, Ontario, Canada; 2010; pp. 121-130.
Huang, Chin; CPROTO(1) Manual Page; http://bima.astro.umd.edu/nemo/man_html/cproto.1.html; retrieved from the Internet Jun. 14, 2011.
Jouvelot, et al.; Algebraic Reconstruction of Types and Effects; Ecole des Mines de Paris, MIT Laboratory for Computer Sciences, 8 pages.
Karkowski, et al.; Design of Heterogenous Multi-processor Embedded Systems: Applying Functional Pipelining; 0-8186-8090-3/97; 1997 IEEE; pp. 156-165.
Kim, et al.; Scalable Speculative Parallelization on Commodity Clusters; 2010 43rd Annual IEEE/ACM International Symposium on Microarchitecture; 2010; pp. 3-14.
Le, et al.; IBM Power6 microarchitecture; IBM J. Res & Dev., vol. 51, No. 6, Nov. 2007; pp. 639-662.
Liao, et al.; SUIF Explorer: An Interactive and Interprocedural Parallelizer; PPoPP '99, May 1999, Atlanta, Georgia, USA; pp. 37-48.
Mak, Jonathan; Facilitating program parallelisation; a profiling-based approach; Technical Report No. 796, University of Cambridge, Computer Laboratory, based on dissertation submitted Nov. 2010 for PhD to University of Cambridge, St. John's College; 120 pages.
Milberg, Ken; POWER5 Architecture White Paper; Unix-Linux Solutions LLC; 28 pages.
Nethercote, et al.; Valgrind: A Framework for Heavyweight Dynamic Binary Instrumentation; PLDI '07, Jun. 11-13, 2007, San Diego, California, USA; pp. 89-100.
Nethercote, Nicholas; Dynamic Binary Analysis and Instrumentation or Building Tools is Easy; Dissertation submitted for PhD at the University of Cambridge, Trinity College; 2004; 170 pages.
Ottoni, et al.; Automatic Thread Extraction with Decoupled Software Pipelining; Proceedings of the 38th Annual IEEE/ACM International Symposium on Microarchitecture (MICRO '05); 2005; 12 pages.
PG_MediaWiki; CSC/ECE506 Spring 2011/ch3 ab; North Carolina State University; retrieved from the Internet Apr. 11, 2011; 10 pages.
Raman, et al.; Parallel-State Decoupled Software Pipelining; CGO '08, Apr. 5-8, 2008, Boston, Massachusetts, USA; pp. 114-123.
Rangan, et al.; Decoupled Software Pipelining with the Synchronization Array; Proceeding of the 13th International Conference on Parallel Architecture and Compilation Techniques (PACT'04); 2004; 12 pages.
Rul, et al.; A Profile-based tool for finding pipeline parallelism in sequential programs; Parallel Computing Journal; vol. 36; 2010; pp. 531-551.
Talpin, et al.; Polymorphic Type, Region and Effect Inference, Journal of Functional Programming, vol. 2, No. 2; Cambridge University Press, 1992; 28 pages.
Talpin, et al.; The Type and Effect Discipline; In the proceedings of the 1992 Conference on Logic in Somputer Science; IEEE Computer Society Press, 1992; 12 pages.
Thies, et al.; A Practical Approach to Exploiting Coarse-Grained Pipeline Parallelism in C Programs; 40th IEEE/ACM International Symposium on Microarchitecture; 2007; pp. 356-368.
Tournavitis, et al.; Semi-Automatic Extraction and Exploitation of Hierarchical Pipeline Parallelism Using Profiling Information; PACT '10, Sep. 11-15, 2010, Vienna, Austria; 2010; pp. 377-388.
Tournavitis, et al.; Towards a Holistic Approach to Auto-Parallelization; PLDI '09, Jun. 15-20, 2009, Dublin, Ireland; pp. 177-187.
Vachharajani, et al.; Speculative Decoupled Software Pipelining; 16th International Conference on Parallel Architecture and Compilation Techniques; 2007; pp. 49-59.
Vandierendonck, et al.; The Paralax Infrastructure: Automatic Parallelization with a Helping Hand; PACT '10, Sep. 11-15, 2010, Vienna, Austria; 2010; pp. 389-399.
Varma, et al.; Profiling-based Refactoring Framework for Pipelined Parallelism; IBM India Research Laboratory, New Delhi, India; 2010; 10 pages.
Von Praun, et al.; Implicit Parallelism with Ordered Transactions; PPoPP '07, Mar. 14-17, 2007; San Jose, California, USA; pp. 79-89.
Wolf, Tilman; CommBench Homepage; http://www.ecs.umass.edu/ece/wolf/nsl/software/cb/index.html; retrieved from the Internet Mar. 24, 2011; 4 pages.
Wu, et al.; Compiler-driven Dependence Profiling to Guide Program Parallelization; Programming Models and Tools for Scalable Systems Lab, IBM, Yorktown Heights, NY; Center for Embedded Computer Systems, UCI, Irvine, CA; 16 pages.
Wun, et al.; Design of a Scalable Network Programming Framework; ANCS '08, Nov. 6-7, 2008, San Jose, CA, USA, pp. 10-19.
Unknown; Advice-Based Automatic Refactoring for Pipelined Parallelism; 8 pages.
Unknown; An Efficient Methodology for Library/Third Party Code Profiling; 6 pages.
MediaBench II Benchmark; http://euler.slu.edu/~fritts/mediabench/mb2/index.html; retrieved from the Internet Mar. 24, 2011; 4 pages.
Office Action (Mail date Nov. 7, 2013) for U.S. Appl. No. 13/446,089, filed Apr. 13, 2012, Conformation No. 3050.
Amendment (filed Feb. 7, 2014) for U.S. Appl. No. 13/446,089, filed Apr. 13, 2012, Conformation No. 3050.
Notice of Allowance (mailed Aug. 1, 2014) for U.S. Appl. No. 13/446,089, filed Apr. 13, 2012, Conformation No. 3050.
Supplemental amendment (filed Jul. 3, 2014) for U.S. Appl. No. 13/446,089, filed Apr. 13, 2012, Conformation No. 3050.
Advisory Action (mail date Jun. 17, 2014) for U.S. Appl. No. 13/446,089, filed Apr. 13, 2012, Conformation No. 3050.
Final Office Action (mailed Apr. 10, 2014) for U.S. Appl. No. 13/446,089, filed Apr. 13, 2012, Conformation No. 3050.
Final Amendment (filed Jun. 9, 2014) for U.S. Appl. No. 13/446,089, filed Apr. 13, 2012, Conformation No. 3050.
U.S. Appl. No. 14/479,455, filed Sep. 8, 2014, Conf. No. 6054.

* cited by examiner

```
E101:    while (1) {
E102:        if ( feof ( fp ) ) return 0;                    // Task 1
E103:        if ( fread ( data, 1, KK, fp ) != KK) return 0;  // Task 2
E104:        encode_rs ( data, &data [KK] );                  // Task 3
E105:        fwrite ( data, 1, NN, stdout );                  // Task 4
E106:    }
```

FIG. 2

```
L101:  Algorithm NPP (l, k)
L102:    if (k = 0)
L103:      then <∞, ⊥>
L104:    else
L105:      let s = subloops(l)
L106:      sp = {sp | Σ_{c∈s} sp(c) ≤ k, sp ∈ s → [0..k] }
                              // all possible allocation mappings
L107:      S = {EnumerateStages(c, l, k) | c ∈ sp}
L108:      bottleneck = min({b | <b, m> ∈ S})
L109:      in <bottleneck, choose ({m | b = bottleneck, <b,m> ∈ S})>
```

FIG. 3

```
L201:   Algorithm EnumerateStages(a, loop, k):
L202:       let I = dominators(loop) − { δ }   // interior dominators
L203:       par(n :: Int) = {i ∪ { δ } | n − 1 = |i|, i ∈ 2^I}
                                                    // n-stage partitions
L204:       P = ∪_{k≥i≥k+1} par(i)   // all partitions incl. singleton δ stages
L205:       stage(p :: P, d :: p) = dominated(d, loop) // a stage's nodes
L206:           − ∪_{e | e is a dominator of d, loop, and e ∉ p} dominated(e, loop)
            weight(ns :: 2^{dominated(d, loop)}) = Σ_{n∈ns} w(n) //cumulative attribute
L207:       stateless(ns :: 2^{dominated(d, loop)}) = ∧_{n∈ns} sl(n) //cumulative attribute
L208:       answer(ds :: P ) =
L209:           let s = {d | s ⊆ subloops(loop), |s| = 1,
L210:                         s = stage(ds, d)), d ∈ ds }
                                        // subloops implemented as per prior analysis
                                        // regardless of stateful/less status at loop's level
L211:               r = {d | stateless(stage(ds, d)), d ∈ ds − s }
                                        // stateless, replicable stages
L212:               f = (ds − r) − s  // stateful, non-replicable stages
L213:               ra = { < d, max (1, Σ_{c ∈ subloops(loop) ∩ (stage(ds, d))} a(c))>,
                                                                                d ∈ r}
                                        // minimum allocations of replicable stages
L214:               fa = {< d, 1 > | d ∈ f}
                                        // stateful stages granted unitary threads
L215:               fb = max ({weight(stage(ds, d)) | d ∈ f })
L216:               sa = a             // allocated threads
L217:               sb = max { b | <b, m> = NPP(d, y), <d, y> ∈ sa }
L218:               x = k − Σ_{<d,y> | <d, y> ∈ sa, y ≠ ∞} c
                                        //spare threads for replicable stages
L219:           in
L220:           if ((x < 0) ∨ min({y | <d, y> ∈ sa }) = 0)
L221:               then <∞, ⊥>
                                        // overprovisioned, or un-provisioned loop
```

FIG. 4A

```
L222:   else
L223:     let rx = { <<d, c>, ⌈y⌉> | y > 0, y = N×weight(
                        stage(ds, d)) − c, <d, c> ∈ ra}
                //extra threads asked by some replicable stages
L224:     ask = Σ_<a,<c,_>>∈rx} c
L225:   in
L226:     if (ask ≤ x)
L227:       then
L228:         let
L229:           rg = { <d, b + c> | <<d, b>, c> ∈ rx}
                    // granted allocations
L230:           bottleneck = max ({fb, sb} ∪
L231:               {weight(stage(ds, d))/c | <d, c> ∈ rg})
L232:           map = λ d :: ds . if (d ∈ s) then sa(d)
L233:                             else if (d ∈ f) then fa(d)
L234:                             else rg(d)
L235:         in <bottleneck, map>

L236:       else
L237:         let rt = { <rp, max({weight(stage(ds, d))/
                          (ra(d) + rp(d))| d ∈ r })>|
                        x = Σ_<c>∈r rp(c), rp ∈ r → {0..x} }
                // all possible extra allocation mappings
                // (rp), and the corresponding bottlenecks
L238:           rg = { <m, b> | b = min({b | <m, b> ∈ rt}),
                          <m, b> ∈ rt}
                // granted allocations, with min bottleneck L239:           bottleneck = max ({fb, sb} ∪
                          { b | <m, b> ∈ rg})
L240:           rga = choose({m | <m, b> ∈ rg})
L241:           map = λ d :: ds . if (d ∈ s) then sa(d)
L242:                             else if (d ∈ f) then fa(d)
L243:                             else rga(d) + ra(d)
L244:         in <bottleneck, map>
```

FIG. 4B

```
L245:     candidates = {answer(p) | p ∈ P − par(k+1)}
L246:     others = {answer(p) | l=lstage(p, δ)l, p ∈ par(k+1)}
L247:     total = candidates ∪ others
L248:     adjusted = SMT_adjusted(total);
L249:     bottleneck = min({b | <b, c> ∈ adjusted})
L250: in
L251:     <bottleneck, choose({c | b = bottleneck,
                                    <b, c> ∈ adjusted})
```

FIG. 4C

AUTOMATIC PIPELINE PARALLELIZATION OF SEQUENTIAL CODE

BACKGROUND

The present invention discloses a system and associated method for automatically and optimally recursive Parallel Stage-Decoupled Software Pipelining of loop nests in sequential C/C++ programs. Conventional parallelization methods are not effective for optimal decoupled software pipeline parallelization because conventional parallelization methods do not provide at least one or more of the following capabilities of automatic refactoring of sequential source code, automatic identification of pipeline stages, and static pipeline analysis based on program dependence graph taking all replications and coalesces of all pipeline stages into account.

BRIEF SUMMARY

According to one embodiment of the present invention, a method for automatically pipeline parallelizing a nested loop L in sequential code over K number of threads comprises: discovering all thread allocations that map each subloop of the nested loop L to a subset of said K number of threads; configuring all combinations of stage partitions executing the nested loop L by parallelly running said each subloop by said K number of threads pursuant to task dependencies of the nested loop L, wherein each stage partition of said all combinations is associated with each thread allocation from said discovering; calculating a respective bottleneck of each combination from said configuring, wherein the respective bottleneck represents a respective highest fraction in percentage of workload of the loop L allocated to a CPU among said K number of threads; and selecting a smallest bottleneck from said calculating such that a first combination associated with the smallest bottleneck is utilized in parallelizing the nested loop L for a most uniformly distributed workload over said K number of threads.

According to one embodiment of the present invention, a computer program product comprises a computer readable memory unit that embodies a computer readable program code. The computer readable program code contains instructions that, when run by a processor of a computer system, implement a method for automatically pipeline parallelizing a nested loop in sequential code over K number of threads.

According to one embodiment of the present invention, a computer system comprises a processor, a memory coupled to the processor, and a computer readable storage device coupled to the processor, said storage device containing program code configured to be executed by the processor via the memory to implement a method for automatically pipeline parallelizing a nested loop in sequential code over K number of threads.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for automatically pipeline parallelizing a nested loop in sequential code over K number of threads.

BRIEF DESCRIPTION OF THE SEVERAL VIEWS OF THE DRAWINGS

FIG. 2 is an example of a "C" language sequential code input to the source code annotator 20 of FIG. 1, demonstrating inter-task dependencies and inter-iteration dependencies, in accordance with embodiments of the present invention.

FIG. 3 is a pseudo code for a method Nested Pipeline Partitioning NPP( ) discovering a bottleneck assignment and pipeline stages in parallelizing a sequential nested loop, which is performed by the task dependency analyzer 35 of FIG. 1, in accordance with the embodiments of the present invention.

FIGS. 4A, 4B, and 4C are a pseudo code for a method EnumerateStages( ) enumerating stateful stages in the dependency graph to find optimal allocation combinations for subloop, which is invoked by NP( ) of FIG. 3, which is performed by the task dependency analyzer 35 of FIG. 1, in accordance with the embodiments of the present invention.

DETAILED DESCRIPTION

Figure 1:
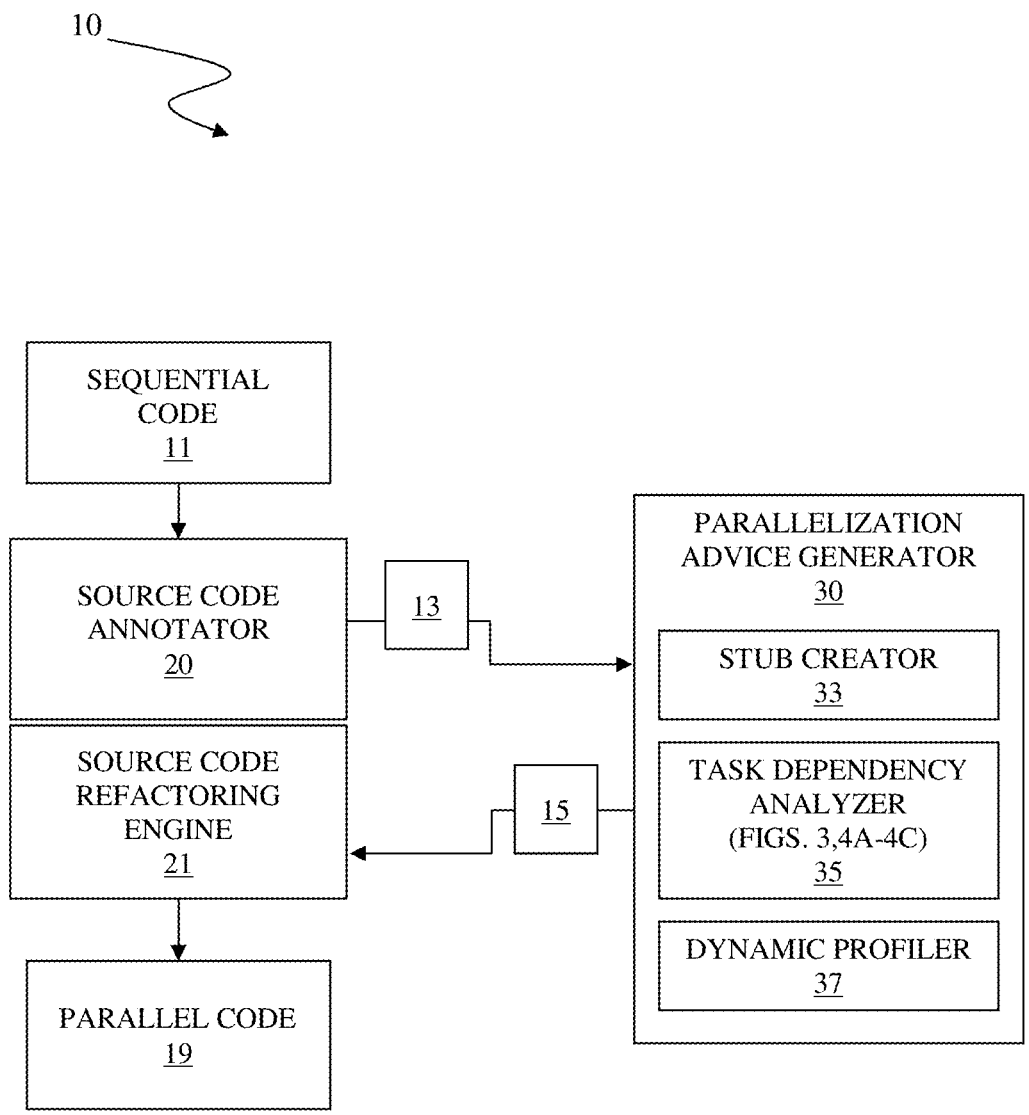
FIG. 1 illustrates a system 10 for automatic pipeline parallelization of nested loops in sequential code, in accordance with embodiments of the present invention.

FIG. 1 illustrates a system 10 for automatic pipeline parallelization of nested loops in sequential code, in accordance with embodiments of the present invention.

The system 10 comprises a source code annotator 20, a source code refactoring engine 21 and a parallelization advice generator 30.

The source code annotator 20 receives input of sequential code 11, annotates identified outermost loops in the sequential code 11 for dynamic profiling, and passes the annotated sequential code 13 to the parallelization advice generator 30. In response, the source code refactoring engine 21 receives a parallelization advice 15 for each annotated loop from the parallelization advice generator 30. Subsequently the source code refactoring engine 21 produces output of parallel code 19 by refactoring the loops of the sequential code 11 based on the received parallelization advice 15.

The sequential code 11 comprises at least one loop. The parallel code 19 produces an output same as the sequential code 11 but is executable in pipeline parallel model, which is achieved by refactoring the sequential code 11 based on the parallelization advice 15. For effective parallelization in minimizing parallel code running time as compared to the sequential code running time, several issues to be addressed by the source code refactoring engine 21 may be, inter alia, batching of input and output (I/O) operations, buffering of data passed between pipeline stages, using minimum variable locks, handling variable aliases, and handling I/O file-pointers, etc.

The parallelization advice generator 30 comprises a stub creator 33, a task dependency analyzer 35, and a dynamic profiler 37. The stub creator 33 enables dynamic profiling of method calls in the annotated sequential code 13 by generating method stubs corresponding to respective method calls in the annotated sequential code 13 by use of idiom-stub mappings in the stub creator. In this specification, a method stub is defined as a piece of program code that exactly simulates read/write behaviors of all in-scope variables appearing in an original method call and that has no side-effects on the operations inside/outside the original method call. Although there are numerous ways in which a method performs read/write operations on in-scope variables of the method, only a limited number of read-write patterns are most commonly found that are defined as idioms in this specification. The idiom-stub mappings of the stub creator 33 stores predefined stub method code for corresponding idioms. For each library method call found in the annotated sequential code 13, a corresponding library method stub is created in case the corresponding library method stub does not exist. Calls to the actual library methods are replaced with calls to corresponding library method stubs for accurate dynamic analysis of library code.

The task dependency analyzer 35 analyzes inter-iteration dependencies originating from nested loops in the sequential code 11 that needs to be considered in parallelizing the sequential code 11. Loops with inter-iteration dependencies in the sequential code 11 are converted for parallel execution by use of pipelined, decoupled, thread-level parallelism. Each loop in the sequential code 11 is divided into concurrently executable partitions in the parallel code 19, wherein each partition of the parallel code 19 performs a part of the original loop in the sequential code 11. Each partition in the parallel code 19 is assigned to a respective thread for execution. One thread communicates with another thread by use of pipelining. The threads are decoupled in the sense that each thread runs independently from progress of other threads.

The dynamic profiler 37 analyzes data dependencies on identified pipe-tasks and loop iterations by gathering information of runtime behavior comprising memory operations of the sequential code 11. In C programming language, static analysis of pointer arithmetic is ineffective due to lack of precision, and dynamic analysis is necessary in determining various properties of runtime behavior such as, inter alia, data dependencies, loop independence window, etc. The dynamic profiler 37 performs several runs of the sequential code 11 and collects information relevant to parallelization of the sequential code 11. The sequential code 11 needs to be instrumented either at source level or at executable level by use of compiler-integrated instrumentation such that the dynamic profiler 37 monitors and traces runtime behaviors of the sequential code 11 and collects parallelization-related information to produce the parallelization advice 15. Several issues to be addressed by the parallelization advice generator 30 may be, inter alia, profiling of library code, managing of profiling time and space, handling of static and global variables, and handling of variable aliases, etc.

In one embodiment of the present invention, the system 10 is implemented on a distributed platform comprising the source code annotator 20 processing an Eclipse™-based C/C++ source code on a client computer system running Windows® operating system. (Eclipse is a trademark of the Eclipse Foundation in the United States and other countries; Windows is a registered trademark of Microsoft Corporation in the United States and other countries.) In the same embodiment, the parallelization advice generator 30 is embodied a IBM® POWER6® computer system running Linux® operating system, wherein the Power 6 computer system has eight-processing cores capable of supporting two-way Simultaneous Multithreading (SMT), with an IBM x1C v.10.1 compiler for compiling internal profiling codes for the dynamic profiler 37. (Linux is a registered trademark of Linus Torvalds in the United States and other countries; IBM and POWER6 are registered trademarks of International Business Machines Corporation in the United States and other countries.) In the same embodiment, the parallelization advice generator 30 utilizes a dedicated, modified Toronto Portable Optimizer (TPO) module linked with the IBM x1C v.10.1 compiler in generating instrumented W-code for profiling by the dynamic profiler 37 at the intermediate representation (IR) level.

FIG. 2 is an example of a "C" language sequential code input to the source code annotator 20 of FIG. 1 supra, demonstrating inter-task dependencies and inter-iteration dependencies, in accordance with embodiments of the present invention.

Lines E101 through E106 show a sequential loop with standard C library calls to feof( ), fread( ) and fwrite( ). Procedure encode_rs( ) in line E104 is defined by a programmer. To convert the sequential loop into a parallel pipelined loop, pipe tasks are identified as shown in listing, wherein line E102 is referred to as Task1, wherein line E103 is referred to as Task2, wherein line E104 is referred to as Task3, and wherein line E105 is referred to as Task4. In this specification, terms "pipe task" and "task" are used interchangeably.

Data dependencies across Task1, Task2, Task3, and Task4 which are collectively referred to as "inter-task dependency", are subsequently analyzed. The Inter-task dependencies are identified by creating a respective library method stub that suits for parallelization and then by tracking memory operation of variables appearing in the library method stubs. Inter-task dependencies of the sequential loop of FIG. 2 are: for a first dependent variable fp, if Task1 is a source task then Task2 is the sink task; and if Task2 is the source task then Task2 is the sink task; for a second dependent variable data, if Task2 is a source task, then both Task3 and Task4 are sink tasks, and if Task3 is the source task then Task4 is the sink task; and for a third dependent variable stdout, Task4 is both a source task and a sink task.

The first dependent variable fp and the third dependent variable stdout also have inter-iteration dependencies as is noted by the fact that, for both variables, the same task is source as well as sink task. The second dependent variable data does not have any inter-iteration dependency because the variable data is overwritten by the library call fread( ) in Task2 at the beginning of each iteration of the sequential loop.

FIGS. 3, 4A, 4B, and 4C use pseudo code representation. Pseudo code describes logical procedure according to set theory and functional notation, wherein a pair of angular brackets denotes a tuple such that <a, b> represents a tuple having a and b as elements, wherein ⊥ denotes an undefined quantity, wherein a let expression denotes a scope of definitions followed by use such that let x=f( ) in $x^2$ introduces a definition of x as f( ) in yielding $x^2$ as an answer, wherein lambda notation describes unnamed functions such that λd:: fa.1 represents a function with argument d of type fa, yielding 1 as an answer, wherein domain→result denotes function sets and types such that sp ∈ s→[0 . . . k] indicates sp is a function from argument of set or type s to an answer in a range of [0 . . . k], wherein $2^I$ denotes a powerset of set I, wherein |I| denotes a size of a set I, wherein a minus symbol (−) denotes a setminus, wherein ^ denotes logical AND, wherein denotes logical OR, and wherein a variable name in an inner scope overrides the variable name in an outer scope. Also, function application f(a,b) denotes function f is applied to arguments a and b, a binary relation is defined as a set as well as a function from a first domain to a second domain such that f={<α, 1>|α∈Int} denotes a function f=a::Int.1, wherein Int indicates integer. Ceiling notation of floating numbers denotes a next largest integer such that ⌈5.1⌉=6. A function choose(s) is non-deterministic operator for picking one member from a set s such that choose ([0 . . . 5]) yields any integer from 0 to 5. Double slash denotes descriptive and non-functional comments as in C/C++ programming language. In this specification, the term algorithm shown in the drawings indicates a machine-executable logical procedure. In one embodiment of the present invention, choose(s) is implemented as a user-interactive session to select a member out of a provided set of choices.

FIG. 3 is a pseudo code for a method Nested Pipeline Partitioning NPP( ) discovering a bottleneck assignment and pipeline stages in parallelizing a sequential nested loop, which is performed by the task dependency analyzer 35 of FIG. 1, supra, in accordance with the embodiments of the present invention.

As a prerequisite, a true-dependencies-graph (TDG) representation containing data-dependency and memory access ordering information of the sequential loop code is generated. In the TDG, nodes represent blocks of pipe tasks and edges represent dependencies between the blocks of pipe tasks. Two blocks are determined to be dependent on each other if a memory location which is accessed by both blocks exists and one of the accesses is a write operation. A direction of the dependence is from an earlier accessing block to a later accessing block. The TDG may have cycles due to back edges arising from inter-iteration dependencies. Cycles in the TDG are identified as strongly connected components (SCCs) and then modified to make one larger block for each SCC in the TDG by merging intra-SCC blocks. If an inner loop block is merged with an outer loop block while modifying the TDG for SCCs, then the whole inner loop is merged with the outer loop block to preserve parallelization decisions taken for each loop as a whole as a part of nest-aligned refactoring strategy. The resultant larger SCC blocks are labeled either as stateful blocks which have inter-iteration dependencies, or replicable stateless blocks without the inter-iteration dependencies. The inter-iteration dependencies in the stateful blocks mandate sequential execution of iterations of stateful blocks such that iterations of stateful blocks must not be parallelized to preserve inter-iteration dependencies.

The task dependency analyzer then analyzes a nested loop wherein each loop body is partitioned into blocks. In this specification, terms block, subloop, and partition are used interchangeably to indicate a part of the original nested loop divided by the task dependency analyzer. NPP( ) produces an optimal, nest-aligned, homogeneously-replicated, homogeneously-CPU-allocated, rooted-dependency-stages pipeline/do-all parallelization for the nested loop when such optimal partition exists. NPP( ) takes polynomial time in producing the optimal partition.

Each partitioned block comprises contiguous statements such that there is only one entry and one continuation exit for the block. Initially the partitioning maximizes the number of blocks. Loop header of the nested loop may be reduced and treated straightforwardly as a conditional exit from the loop making up a special block with two exits wherein all other computation gets shifted from the loop header. The task dependency analyzer utilizes dynamic profiler for generation of the parallelization advice such that the sequential code is refactored for parallel execution with minimum user interaction. The parallelization advice for the nested loop identifies places and proposed refactorings of the sequential code for a user to accept or reject.

A loop determined to be do-all can be replicated as a single-stage computation, unless useful Simultaneous Multi-Threading (SMT) pipelines can be formed in which case the replication is multistage pipelined. NPP( ) performs stage partitioning of a hot loop nest with polynomial complexity, wherein exploring thread allocation options in the order of O(S3N+1), where S is a number of statements in the loop nest and N is a constant number of machine CPUs. NPP( ) produces the minimum bottleneck for tree dependency graphs and rooted-dependency stages, which trivially covers all linear dependency graphs.

In the loop partitioning into stages algorithm that follows, blocks are mapped to a set of stages such that the acyclic nature of the dependency graph between stages is maintained. This ensures that communication along pipes does not become cyclic.

In this specification, bottleneck assignment of a loop is defined as a highest fraction in percentage of work of the loop allocated to a single CPU among uniform CPU partitions implementing the work of the loop. With a typical parallel execution model wherein total amount of work of the loop is partitioned into stages with uniform CPU allocation per stage such as executing one SMT thread per stage, the bottleneck assignment reduces the fraction of the loop work allocated to a largest stage. In a parallel execution model with N number of stages implementing the loop with a dedicated CPU partition apiece, maximum 1/N workload of the loop computation for each stage is optimal distribution. In this specification, terms "uniform CPU partitions", CPUs, and "SMT threads" are used interchangeably.

NPP(l, k) of line L101 represents a logical procedure performing nested pipeline partitioning for a loop nest l, with k number of CPUs.

Lines L102 and L103 represents a case wherein no CPU for thread allocation exists.

Line L104 through line L109 represents a case wherein at least one CPU for thread allocation exists.

Line L105 assigns variable s to any subloop of the loop nest l. Function subloops( ) produces a set of children subloops of the loop nest l that have not been previously merged into stateful blocks during TDG formation.

Line L106 investigates all possible allocation mappings of k threads among the subloops s using the set sp of functions mapping the subloops s to allocated thread quantities. For each of these allocations, EnumerateStages( ) is invoked to obtain set S of all stage partitions for loop l.

In one parallelization scenario, two sibling loops of loop l are to be parallelized. A first sibling loop comprises sequential stages of A, B, C, and D, while the second sibling loop is a do-all made of stage E that can be replicated, wherein A and C stages are stateful, B, D, and E are stateless, and wherein computation workload percentage of A, B, C, D, and E stages are 1%, 4%, 1%, 4%, and 90%. Assuming 32 CPUs are available for allocation to the stage partitions of the loop nest, in a first run, the task dependency analyzer allocates 90% of CPUs (28.8, that is 28 or 29) to E stage and 10% of CPUs (3.2, that is 3 or 4) to A, B, C, and D stages. Because stages A and C are stateful, either stage A or stage C cannot be replicated for parallelization. With three (3) threads allocated for the first sibling loop, either (A,B) or (C,D) will share a stage at best, while retaining a decoupled acyclic pipeline structure, resulting in a bottleneck assignment of 5%/1=5%. With 4 threads, at best the bottleneck assignment is reduced to 1 thread per stage, which means a bottleneck of 4%/1=4%.

In a second run of the same parallelization scenario, the thread allocation is arbitrarily set regardless of fractional workload percentage. If 6 CPUs are assigned to the loop ABCD, with individual CPU allocation for stages A, B, C, and D being 1, 2, 1, and 2, respectively, then the bottleneck assignment is reduced to 4%/2=2%, which is optimal because the bottleneck is below theoretical limit of 100%/32=3.125%. In the same experiment, the rest of 26 CPUs are allocated to the second sibling loop E, of which bottleneck is 90%/26=3.46%. Even though the bottleneck for E is greater than the theoretical optimal of 3.125%, but 3.46% is less than the 4% from the first run. The bottleneck assignment results from both runs demonstrate that allocating threads proportional to computation workload does not always produce optimal parallelization result. To search for optimal allocation combinations for subloops, acyclic stages in the dependency graphs must be enumerated as shown in EnumerateStages( ) of line L107. See FIG. 4 infra and accompanying description for details of EnumerateStages( ).

The bottleneck assignment is the minimum bottleneck among all the answers listed in S as shown in lines L108 and L109. NPP(l, k) returns the minimum discovered bottleneck to the task dependency analyzer, paired with one non-deterministic partitioning choice among all answers with the same bottleneck assignment. If the bottleneck assignment is significantly larger than optimal l/k, the task dependency analyzer determines that the workload of the loop is primarily sequential such that not all the parallel hardware is best used for the loop l. The task dependency analyzer may run NPP(l, k) repeatedly, with fewer number of CPUs to reduce the bottleneck assignment, until an optimal bottleneck assignment with a minimum number of CPUs for a maximum parallelization is acquired.

FIGS. 4A, 4B, and 4C are a pseudo code for a method EnumerateStages( ) enumerating stateful stages in the dependency graph to find optimal allocation combinations for subloop, which is invoked by NPP( ) of FIG. 3 supra, which is performed by the task dependency analyzer 35 of FIG. 1, in accordance with the embodiments of the present invention.

Prior to starting EnumerateStages( ), a true dependency graph of loop is preprocessed to replace each nested loop in loop with a special, equivalent subloop block. A special root node having no computation weight and stateless status for the dependency graph of loop has outgoing edges to all earlier independent roots such that the dependency graph of loop is rooted. The special root with zero computation weight is one example of a dominator node, according to standard definition of domination in graph, wherein a node dominates all nodes wherein all paths from a root to said all nodes traverses the node. Accordingly, in this specification, a dominator node is defined as a node in a dependency graph of a loop, through which all nodes in the dependency graph can be reached. A dominator node is special in that the graph reached from the dominator node has only incoming dependencies to the dominator node to consider from the rest of the dependency graph. If a stage is formed by a dominator node and the graph it reaches, then these incoming nodes are the only pipes to consider. In EnumerateStages( ) dominators are used to propose stages, because a dominator and a block dominated by the dominator composes a stage setminus other stages.

EnumerateStages(a, loop, k) in line L201 represents a logical procedure enumerating stateful stages in the dependency graph of a loop named loop, wherein a number of threads are allocated in k number of CPUs exist in the platform.

Wherein K is maximum number of stages for the loop, and D is a number of dominator nodes, total$_{D-1}C_{K-1}$ number of combinations of dominator nodes can be listed for all stages. Covering root means the loop is always fully covered. Similarly, lesser number of stages can be enumerated (than K). For each combination of stages, finding the computation represented by each stage is at most a linear time traversal in terms of the number of blocks. The stage graph for a combination comprises the dependencies reaching into an inner dominator node from a stage associated with an outer dominator, representing the data and order dependencies to be communicated. Consequently, bottleneck assignment value of each combination including the replication of stateless stages is calculated. A stage can be replicated if the number of stages being enumerated is less than the maximum K so that free threads are available to replicate a stateless stage multiple times. A block introduced into the dependency graph to represent a nested loop is considered for parallel implementation as per prior analysis only.

EnumerateStages( ) calls NPP( ) of FIG. 3 supra recursively on the subloops in line L217 thus subloops of a loop needs to be analyzed to make NPP( ) results for the subloops available prior to analyze a loop. In one embodiment of the present invention, an efficient schedule for NPP( )/EnumerateStages( ) is to call NPP( ) on all arguments in an inside-out manner on the subloops of a loop nest if the loop nest comprises a stage without other loops. If the loop nest does not comprise a stage alone, analysis result rendered up to the point is ignored and the loop block is considered for implementation by inline merger with the other nodes of the stage the loop block falls in, resulting in parallelization by whole stage replication.

Nondeterministic choice among the dominator combinations with the lowest bottleneck assignment value can be made available interactively via choose( ) as shown in lines L240, L251. The parallelization is finalized by removing a stage containing solely the special root node.

Variable δ in line L202 represents the special root dominator node for loop introduced by aforementioned preprocessing. Function dominators( ) in line L202 produces all dominator nodes in loop. Consequently, set I in line L202 is non-root dominators of loop.

Function par( ) in line L203 produces dominator sets of size n including δ. Each dominator set produced by par( ) defines a stage partitioning of the loop, with a total of n stages in the partitioning.

Set P in line L204 comprise all partitions up to size (k+1). Because of artificially added special root node δ, size (k+1) instead of size k is used not to waste thread allocation. A combination with a singleton stage with solely δ is valid, wherein the singleton stage is no allocated to a thread and k number of other stages is allocated with a respective thread accordingly.

Function stage( ) in line L205 produces all nodes in stage d belonging to partition p, which implicitly lists all other dominators/stages that have to be ruled out of d. Function dominated( ) in line L205 produces all nodes dominated by a dominator node.

Function weight( ) of line L206 produces a cumulative result of computation weight w( ). Function stateless( ) of line L207 produces statelessness sl( ) attributes of nodes in an argument set of nodes.

Function answer( ) in line L208 maps a partition ds to an optimal parallelization of ds in terms of mapping the stages in ds to CPUs that minimize the bottleneck assignment. Function answer( ) returns the partition ds and mapped optimal parallelization of ds, using choose( ) to select among multiple equivalent options as calculated in lines L209 through L251.

Set s in lines L209 and L210 represents a stateless subloop as several replicated do-all stages simply as a stateless singleton dominator partitioning comprising δ, offering a merged, single-stage, do-all implementation of the loop.

Set r of line L211 comprises stateless stages that can be replicated freely in instantiations. Set ra of line L213 identifies thread allocations for replicable stages with all stage identifications being done by dominator nodes in the context of partitioning ds. Set ra identifies minimum allocations since replication can be entertained further based on spare threads. Each stage in ra has at least one thread for itself, the number increasing to the allocation of subloops merged within the stage.

Set f of line L212 comprises stages with state that must be implemented sequentially. Set fa of line L214 identifies the thread allocations for stateful stages, which is one thread for each stage, with all stage identifications being done by their dominator nodes in the context of partitioning ds.

Value x of line L218 indicates a number of spare threads left over after allocating threads for subloops, stateful stages and minimal commitments to replicable stages. If value x is negative indicating that the threads are already overallocated, or that some subloops are committed to be implemented with no threads, then answer( ) prunes the search with an undefined mapping and ∞ bottleneck as the result, as shown in lines L220 and L221.

If value x is greater than or equal to zero, a demand for extra threads for replicable stages rx is computed, which comprises the minimum number of threads needed to make each bottleneck of respective replicable stage go below the theoretical limit of bottlenecks, which is 1/N in percentile, as shown in lines L222 and L223.

Total demand of all replicable stages is computed and saved as variable ask, as shown in line L224.

If ask can be met by x, then demands rx are used to commit threads to replicable stages and a final answer for partitioning ds is made available, as shown in lines L226 through L235.

If total extra thread demand ask is greater than number of available spare thread x, then all possible allocations of x threads to replicable stages are explored in set rt in line L237 along with bottlenecks for the replicable stage computed for the allocations. In set rg, shown in line L238, the minimum-bottleneck solutions in set rt are declared as granted allocations for the replicable stages. Finally the result incorporating thread allocation for subloops and stateful stages is produced by answer (ds).

In line L245, function answer( ) is applied to all partitions (P−par(k+1)) of k-thread allocations to yield the variable called candidates for a final contention on bottleneck.

In line L246, an alternative set of answers is computed as set others, which reflects partitions of (k+1) threads with singleton δ stages. Set others covers a natural loop covering listing of dominators without δ that occupies k threads. Because the natural loop of dominators has been eliminated from combinations to be searched with k threads and δ8, the natural loop needs to be explicitly addressed by use of set others.

In line L247, set of partitions total represents a union of sets candidates and others.

In line L248, set adjusted is acquired by applying function SMT_adjusted( ) with parameter total, rendering adjusted set of partitions for SMT threads. Function SMT_adjusted( ) performs local optimization for SMT pipelining, based on a characteristic of SMT threads that SMT threads perform effectively when workloads comprise I/O operations on one SMT and compute operations on another SMT in a processor core.

The adjusted result is reflected in choosing minimum bottleneck as one option, as shown in lines L249 through L251, which is assigned to answer (ds) of line L208 and a final result of EnumerateStages( ).

Figure 5:
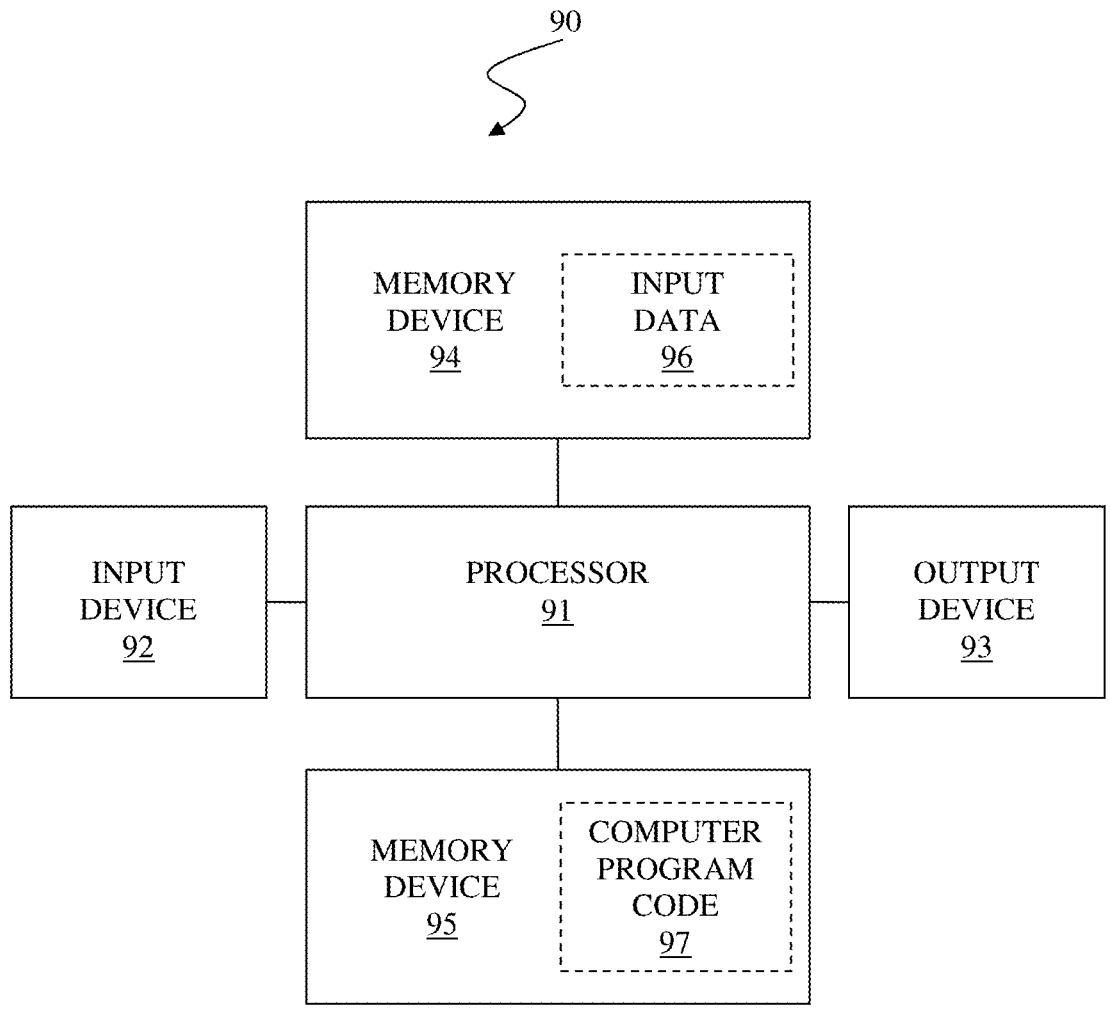
FIG. 5 illustrates a computer system used for automatic pipeline parallelization of nested loops in sequential code, in accordance with the embodiments of the present invention.

FIG. 5 illustrates a computer system used for automatic pipeline parallelization of nested loops in sequential code, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for automatic pipeline parallelization of nested loops in sequential code of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for automatic pipeline parallelization of nested loops in sequential code.

In another embodiment, the invention provides a method that performs the process steps of the invention on a subscription, advertising and/or fee basis. That is, a service provider, such as a Solution Integrator, can offer to create, maintain, support, etc., a process for automatic pipeline parallelization of nested loops in sequential code of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD- ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically pipeline parallelizing a nested loop L in sequential code over K number of threads, said method comprising:

discovering, by a processor of a computer system, all thread allocations that map each subloop of the nested loop L to a subset of said K number of threads;

said processor configuring all combinations of stage partitions executing the nested loop L by parallelly running said each subloop by said K number of threads pursuant to task dependencies of the nested loop L, wherein each stage partition of said all combinations is associated with each thread allocation from said discovering;

said processor calculating a respective bottleneck of each combination from said configuring, wherein the respective bottleneck represents a respective highest fraction in percentage of workload of the nested loop L allocated to a Central Processing Unit (CPU) among said K number of threads; and said processor selecting a smallest bottleneck from said calculating, wherein a first combination associated with the smallest bottleneck is utilized in parallelizing the nested loop L for a most uniformly distributed workload over said K number of threads.

2. The method of claim 1, said configuring comprising:
  determining a set R comprising stateless stages that enable replication for parallel execution;
  determining a set F comprising stateful stages that are required to execute sequentially based on the determined set R;
  determining a set RA comprising minimum allocations of stateless stages without replication;
  determining a set FA comprising allocations among the determined set F that had been allocated to a thread of said K number of threads; and
  determining a value X representing a number of threads available for replicating the stateless stages, wherein the value X is calculated based on the determined RA and minimum allocation for the stateful stages.

3. The method of claim 2, said configuring further comprising:
  determining that said K number of threads properly provide the nested loop L by examining the determined value X; and
  computing a value ASK indicating a total demand of replication for the stateless stages.

4. The method of claim 3, said configuring further comprising:
  determining that the computed value ASK is less than or equal to the determined value X indicating that the number of threads available for replicating the stateless stages accommodates the total demand of replication for the stateless stages; and
  configuring said all combinations of stage partitions as all possible allocations of X number of threads to replicate the stateless stages.

5. The method of claim 3, said configuring further comprising:
  determining that the computed value ASK is greater than the determined value X indicating that the number of threads available for replicating the stateless stages is not able to accommodate the total demand of replication for the stateless stages; and
  configuring said all combinations of stage partitions as said minimum allocation for the stateless stages.

6. A computer program product comprising:
  a computer readable hardware storage device having a computer readable program code embodied therein, said computer readable program code containing instructions that perform a method for automatically pipeline parallelizing a nested loop L in sequential code over K number of threads, said method comprising:
  discovering, by a processor of a computer system, all thread allocations that map each subloop of the nested loop L to a subset of said K number of threads;
  said processor configuring all combinations of stage partitions executing the nested loop L by parallelly running said each subloop by said K number of threads pursuant to task dependencies of the nested loop L, wherein each stage partition of said all combinations is associated with each thread allocation from said discovering;
  said processor calculating a respective bottleneck of each combination from said configuring, wherein the respective bottleneck represents a respective highest fraction in percentage of workload of the nested loop L allocated to a Central Processing Unit (CPU) among said K number of threads; and
  said processor selecting a smallest bottleneck from said calculating, wherein a first combination associated with the smallest bottleneck is utilized in parallelizing the nested loop L for a most uniformly distributed workload over said K number of threads.

7. The computer program product of claim 6, said configuring comprising:
  determining a set R comprising stateless stages that enable replication for parallel execution;
  determining a set F comprising stateful stages that are required to execute sequentially based on the determined set R;
  determining a set RA comprising minimum allocations of stateless stages without replication;
  determining a set FA comprising allocations among the determined set F that had been allocated to a thread of said K number of threads; and
  determining a value X representing a number of threads available for replicating the stateless stages, wherein the value X is calculated based on the determined RA and minimum allocation for the stateful stages.

8. The computer program product of claim 7, said configuring further comprising:
  determining that said K number of threads properly provide the nested loop L by examining the determined value X; and
  computing a value ASK indicating a total demand of replication for the stateless stages.

9. The computer program product of claim 8, said configuring further comprising:
  determining that the computed value ASK is less than or equal to the determined value X indicating that the number of threads available for replicating the stateless stages accommodates the total demand of replication for the stateless stages; and
  configuring said all combinations of stage partitions as all possible allocations of X number of threads to replicate the stateless stages.

10. The computer program product of claim 8, said configuring further comprising:
  determining that the computed value ASK is greater than the determined value X indicating that the number of threads available for replicating the stateless stages is not able to accommodate the total demand of replication for the stateless stages; and
  configuring said all combinations of stage partitions as said minimum allocation for the stateless stages.

11. A computer system comprising a processor, a memory coupled to the processor, and a computer readable storage device coupled to the processor, said storage device containing program code configured to be executed by the processor via the memory to implement a method for automatically pipeline parallelizing a nested loop L in sequential code over K number of threads, said method comprising:
  said processor discovering all thread allocations that map each subloop of the nested loop L to a subset of said K number of threads;
  said processor configuring all combinations of stage partitions executing the nested loop L by parallelly running said each subloop by said K number of threads pursuant to task dependencies of the nested loop L, wherein each stage partition of said all combinations is associated with each thread allocation from said discovering;
  said processor calculating a respective bottleneck of each combination from said configuring, wherein the respective bottleneck represents a respective highest fraction in percentage of workload of the nested loop L allocated to a Central Processing Unit (CPU) among said K number of threads; and said processor selecting a smallest bottleneck from said calculating, wherein a first combination associated with the smallest bottleneck is utilized in parallelizing the nested loop L for a most uniformly distributed workload over said K number of threads.

12. The computer system of claim 11, said configuring comprising:
   determining a set R comprising stateless stages that enable replication for parallel execution;
   determining a set F comprising stateful stages that are required to execute sequentially based on the determined set R;
   determining a set RA comprising minimum allocations of stateless stages without replication;
   determining a set FA comprising allocations among the determined set F that had been allocated to a thread of said K number of threads; and
   determining a value X representing a number of threads available for replicating the stateless stages, wherein the value X is calculated based on the determined RA and minimum allocation for the stateful stages.

13. The computer system of claim 12, said configuring further comprising:
   determining that said K number of threads properly provide the nested loop L by examining the determined value X; and
   computing a value ASK indicating a total demand of replication for the stateless stages.

14. The computer system of claim 13, said configuring further comprising:
   determining that the computed value ASK is less than or equal to the determined value X indicating that the number of threads available for replicating the stateless stages accommodates the total demand of replication for the stateless stages; and
   configuring said all combinations of stage partitions as all possible allocations of X number of threads to replicate the stateless stages.

15. The computer system of claim 13, said configuring further comprising:
   determining that the computed value ASK is greater than the determined value X indicating that the number of threads available for replicating the stateless stages is not able to accommodate the total demand of replication for the stateless stages; and
   configuring said all combinations of stage partitions as said minimum allocation for the stateless stages.

16. A process for supporting computer infrastructure, said process comprising providing at least one support service for at least one of creating, integrating, hosting, maintaining, and deploying computer-readable code in a computing system, wherein the code in combination with the computing system is configured to perform a method for automatically pipeline parallelizing a nested loop L in sequential code over K number of threads, said method comprising:
   discovering, by a processor of the computing system, all thread allocations that map each subloop of the nested loop L to a subset of said K number of threads;
   said processor configuring all combinations of stage partitions executing the nested loop L by parallelly running said each subloop by said K number of threads pursuant to task dependencies of the nested loop L, wherein each stage partition of said all combinations is associated with each thread allocation from said discovering;
   said processor calculating a respective bottleneck of each combination from said configuring, wherein the respective bottleneck represents a respective highest fraction in percentage of workload of the nested loop L allocated to a Central Processing Unit (CPU) among said K number of threads; and
   said processor selecting a smallest bottleneck from said calculating, wherein a first combination associated with the smallest bottleneck is utilized in parallelizing the nested loop L for a most uniformly distributed workload over said K number of threads.

17. The process of claim 16, said configuring comprising:
   determining a set R comprising stateless stages that enable replication for parallel execution;
   determining a set F comprising stateful stages that are required to execute sequentially based on the determined set R;
   determining a set RA comprising minimum allocations of stateless stages without replication;
   determining a set FA comprising allocations among the determined set F that had been allocated to a thread of said K number of threads; and
   determining a value X representing a number of threads available for replicating the stateless stages, wherein the value X is calculated based on the determined RA and minimum allocation for the stateful stages.

18. The process of claim 17, said configuring further comprising:
   determining that said K number of threads properly provide the nested loop L by examining the determined value X; and
   computing a value ASK indicating a total demand of replication for the stateless stages.

19. The process of claim 18, said configuring further comprising:
   determining that the computed value ASK is less than or equal to the determined value X indicating that the number of threads available for replicating the stateless stages accommodates the total demand of replication for the stateless stages; and
   configuring said all combinations of stage partitions as all possible allocations of X number of threads to replicate the stateless stages.

20. The process of claim 18, said configuring further comprising:
   determining that the computed value ASK is greater than the determined value X indicating that the number of threads available for replicating the stateless stages is not able to accommodate the total demand of replication for the stateless stages; and
   configuring said all combinations of stage partitions as said minimum allocation for the stateless stages.

* * * * *